United States Patent
Wong et al.

(10) Patent No.: US 6,412,001 B1
(45) Date of Patent: Jun. 25, 2002

(54) METHOD TO MONITOR AND CONTROL SERVER APPLICATIONS USING LOW COST COVERT CHANNELS

(75) Inventors: Thomas K. Wong, Pleasanton; Panagiotis Tsirigotis, Mountain View; Swee Lim, Cupertino; Sanjay Radia, Fremont, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/240,193

(22) Filed: Jan. 29, 1999

(51) Int. Cl.$^7$ .................................. G06F 15/173
(52) U.S. Cl. ......................................... 709/224
(58) Field of Search ................... 709/224, 105

(56) References Cited

U.S. PATENT DOCUMENTS

| | | | |
|---|---|---|---|
| 5,450,584 A | 9/1995 | Sekiguchi et al. | 395/650 |
| 5,938,732 A | 8/1999 | Lim et al. | 395/200.59 |
| 6,223,205 B1 * | 4/2001 | Harchol-Balter et al. | 709/105 |

OTHER PUBLICATIONS

Article by Woochang Cha entitled "Communicating Pilot Goals to an Intelligent Cockpit–Aid System", Internet document published Jan. 25, 1996, retrieved from http://knut.ku-moh.ac.kr/{chaw/gcm.htm on Aug. 4, 2000.

Article by Keith Loepere entitled "The Covert Channel Limiter Revisited" published by *Operating Systems Review*, vol. 23, No. 2, Apr. 1, 1989, pp. 39–44.

Patent Abstracts of Japan, vol. 1995, No. 8, Sep. 29, 1995, publication No. 07121423, publication date May 12, 1995.

Article by Norman E. Proctor and Peter G. Newmann entitled "Architectural Implications of Covert Channels", retrieved from Internet on Aug. 4, 2000, retrieved from http://www/csl.sri.com/neumann/ncs92.html.

McIlroy & Reeds, "Multilevel Security with Fewer Fetters," AT&T Bell Laboratories pp 24–31, Apr. 1988.

Abrams, et al., "Information Security," An Integrated Collection of Essays, IEEE Computer Society Press, 1995.

* cited by examiner

*Primary Examiner*—John A. Follansbee
(74) *Attorney, Agent, or Firm*—Park, Vaughan & Fleming LLP

(57) ABSTRACT

A covert channel is established between a network service and one or more service monitors in a service group. The covert channel minimizes overhead by providing an indication of the status of the service through use of operating system utilities rather than conventional remote procedure calls (RPCs) or posting methods. The covert channel relies on one or more communication files established and updated by the service and having attributes which are in proportion to the workload of the service. By monitoring these attributes, the service monitor is able to determine the status of the service, including its workload and availability, without incurring costly operational overhead.

30 Claims, 3 Drawing Sheets

METHOD TO MONITOR AND CONTROL SERVER APPLICATIONS USING LOW COST COVERT CHANNELS

BACKGROUND OF THE INVENTION

1. Field of the Invention

The invention relates to network service groups, and more particularly, to a method and apparatus for monitoring the status of services performed by such groups.

2. Description of Related Art

In a client-server networking environment, a network service is typically provided by an application running on a server machine that processes requests sent from many client machines via the network. The primary challenge is to provide a scalable and reliable platform for a network service to process an increasing volume of client requests. U.S. patent application Ser. no. 08/763,289 entitled "Load Balancing and Failover of Network Services," to Swee Boon Lim, and filed Dec. 9, 1996, now U.S. Pat. No. 5,938,732, describes a system having scalable and reliable architecture that uses a group of server machines, each running the same application, to cooperatively provide a network service. To a client machine, the group of server machines, hereafter referred to as a service group, appears as a single server machine.

In such applications, one server machine may provide multiple network services and may belong to multiple service groups. Each server machine that is a member of a service group has a service monitor that monitors the workload and determines the availability status of the service on the server machine. Service monitors of a service group communicate with each other in the service group through a network. One of the service monitors is designated as the service group leader, which periodically collects the workload and availability status of each member of the service group. The service group leader uses the information for load balance and recovery of service crashes.

There are three methods that a service monitor can use to obtain workload and availability status of a service. These are the direct method of remote procedure calls (RPCs), the direct method of posting, and the indirect method of using operating system services. Under the first, remote procedure call (RPC) method, the service monitor implements the client side of the RPC, and the service being monitored by the service monitor implements the server side of the RPC. The service monitor periodically makes a remote procedure call to the service in order to obtain workload information. If the service monitor does not receive an RPC reply from the service and a retry fails after a certain interval, the service monitor can safely assume that the service is dead.

While the RPC approach is straightforward, programming RPCs and setting up the RPC client and server is a complex and expensive procedure, making other options, such as the posting method, attractive. Under the posting method, a service periodically publishes separately its workload and availability status (for example, as the current time) using operating systems services such as shared memory or IP multi-cast or broadcast. A service monitor retrieves the published information from the service that it monitors periodically, which may be at a different interval than that in which publication by the service occurred, and determines the status of the service therefrom. The service monitor can thus detect that the service that it monitors is not available if the time published by the service that represents service availability does not change after a certain interval. Again, however, a drawback of the posting method is the complex programming technique needed to program a service and its service monitor.

Under the indirect method of using operating system services, a service monitor can take advantage of utilities provided by the operating system to determine for example whether a computing process exists, or to obtain the overall CPU (Central Processing Unit) utilization of the system, without directly communicating with the service it monitors. This is particularly useful since service monitors and applications running on a server machine are typically implemented as background computing processes in a server machine and thus lend themselves to such interaction. One operating system that provides such utilities is Solaris™ of Sun Microsystems.

As an example, a service monitor may rely on the CPU utilization of a server machine as a representation of the current workload of a service running on the server machine. There is a direct relationship between the CPU utilization of a system and the workload of a service running in the system. This is because if the CPU utilization of a server machine is high, there will not be enough CPU cycles left over for the service in the server machine to process client requests, i.e. high workload.

Similarly, a service monitor can periodically check the existence of the computing process that implements the service. If the computing process of the service does not exist, the service is not available.

The indirect method is efficient since the cost of obtaining workload or availability status is merely the cost of using the system calls provided by the host operating system. In addition, the service monitor can obtain the workload and service availability information any time without waiting for the service to respond.

A drawback of the indirect method is that it cannot obtain workload information specific to a service. Also, the indirect method cannot really be sure that a service is available: it cannot distinguish a hung computing process that cannot process client requests from a normal computing process that can process client requests.

Thus, it is desirable for a service monitor to obtain workload information and availability status directly from the service that it monitors since such an approach would yield more accurate results. Since direct methods conventionally involve making changes to the services so that workload information specific to the services could be communicated to the service monitors, it is desirable that this information be communicated without using complex programming techniques such as shared memory, remote procedure calls or networking programming. Finally, it is desirable to reduce the cost of obtaining this information in order to maximize service throughput.

SUMMARY OF THE INVENTION

The invention overcomes the deficiencies of the prior art by providing a covert channel to allow communication between a service monitor and the service that it monitors without incurring excessive overhead for monitoring and updating or passing messages indicating certain information. In the preferred embodiment, the covert channel is a communication file whose size corresponds to the workload of the service being monitored, such that the service monitor can determine the workload of the service by merely examining the communication file size attribute. The communication file is also constantly updated by the service in order to provide a "heartbeat" to the service monitor indicating that service is available.

In a second embodiment in accordance with the invention, the "heartbeat" is provided by a second communication file provided for that service. A separate communication file is especially desirable in systems which do not provide a time stamp, or last modification date of a file, in which case the second communication file, by being continuously modified in size by the service, provides the indication that the service is available.

The service or process running on a server in a multi-server environment thus periodically updates information about the communication file to indicate the status and availability of the process. The file is typically a "holey" file, that is, one that occupies no file system memory. The running process updates the size of the file to indicate, for example, the workload of the running process, and the date-last-modified to indicate the availability of the running process. Any other running process and/or monitor, and even ones on other servers, need only examine the file attributes to determine the running process' status and availability. Thus, a covert channel is established between the running process and the monitoring process, bypassing all normal message processing overhead.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENTS

Figure 1:
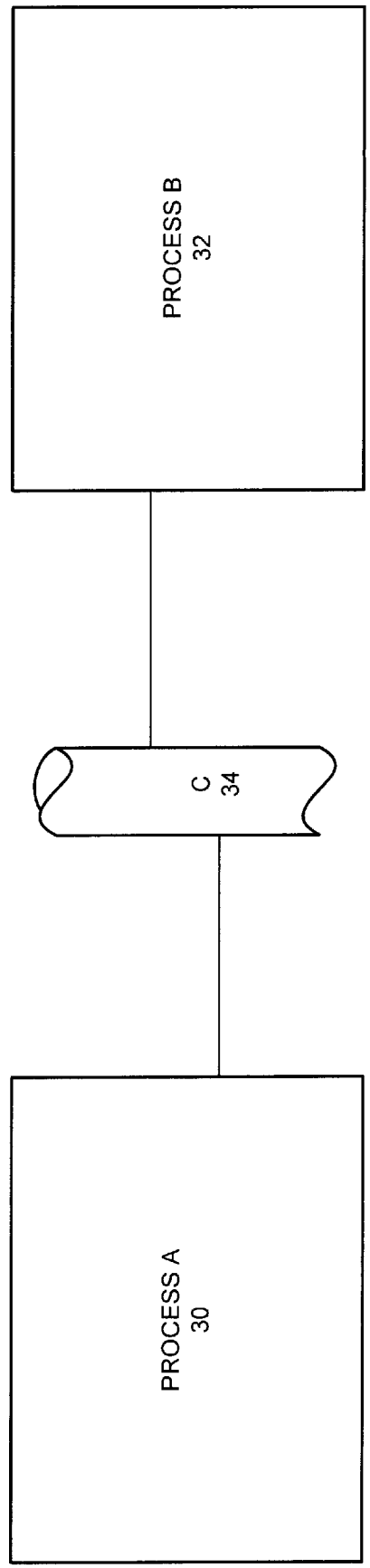
FIG. 1 is schematic diagram showing operation of a covert channel.

A covert channel is a communication channel that allows a computing process to transfer information by exploiting a mechanism not intended to be used for communication. If one computing process can change the state of some characteristics that another process can sense, then a covert channel exists between the two processes. A covert storage channel uses shared system variables as the means of information transfer. FIG. 1 illustrates a covert channel C established between Processes A and B, designated as 30 and 32, respectively. The covert channel C arises with Process A's interaction with any device or process 34 and Process B's separate interaction or access to that same device or process 34. Any manipulations of device or process 34 by Process A can be used to effectively communicate information about Process A to Process B, and vice versa if the channel is bidirectional. For more information on covert channels, see "Information Security, an integrated collection of essays", edited by Marshall D. Abrams, Sushil Jajodia Harold J Podell, IEEE Computer Society Press, 1995, p. 117. A list of covert channel examples can be found in the paper McIlroy,-nd Reeds, J A, "Multilevel security with fewer fetters", Proceeding UNIX Security Workshop (pp. 24–31).

Historically, the objective of a covert channel is to break the multi-level security of a multi-level security enabled computing system. A multi-level secure system contains information with different sensitivities that simultaneously permit access by users with different security clearances and needs to know, but prevents users from obtaining access to information for which they lack authorization. (See Information Security, an integrated collection of essays, edited by Marshall D. Abrams, Sushil Jaodia, Harold J Podell, IEEE Computer Society Press, 1995, pp. 330–349.)

The communication efficiency of a covert channel usually is not of crucial importance, and each information transfer between the cooperating processes via the covert channel may incur expensive overhead.

Figure 2:
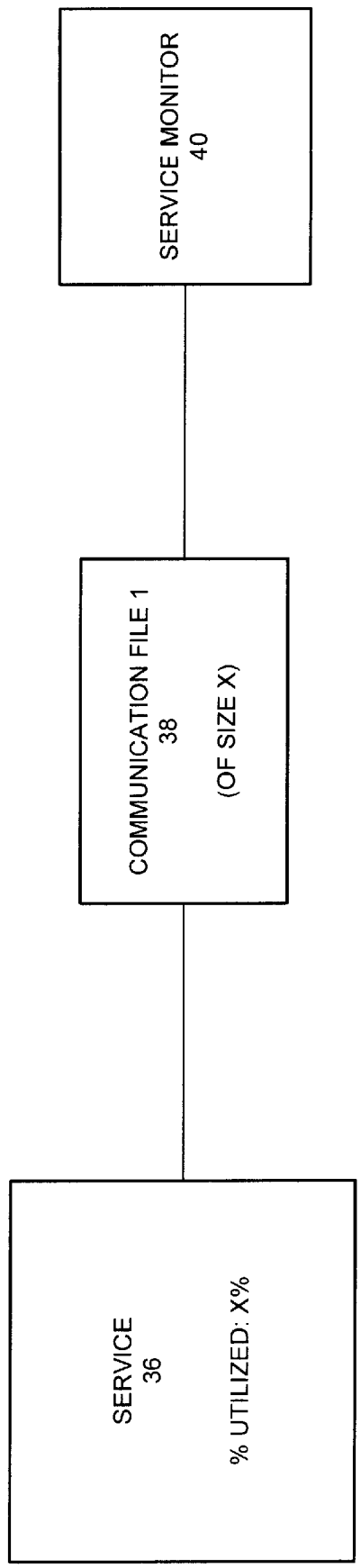
FIG. 2 is a schematic diagram showing a service monitoring system in accordance with the preferred embodiment of the invention.

In accordance with the invention, use of the general purpose but complex and high overhead interprocess communication services provided by the operating system for publishing workload and availability status of a service is avoided. Instead, one or two simple covert channels are relied upon for conveying information regarding workload and availability status of a service. More specifically, the covert channel used in this invention is the size of a predetermined file. For lowest communication overhead, if a system supports holey files and a memory based file system, the covert channel used is the size of a holey file in a memory based file system. Relying on the covert channel, a service monitor thus acquires information indicative of the status of a service and uses this information to inter alia apprise other monitors of this status The file that is agreed upon by a service and its service monitor to be used as the covert channel is hereinafter referred to as a communication file. As can be seen from FIG. 2 illustrating an embodiment in accordance with the invention, a service 36 has associated therewith a communication file 38. The workload of service 36 is represented as an integer number X corresponding to the percent of full capacity at which the service 36 is utilized. The service 36 publishes its workload number periodically by setting the size of the communication file 38 to be the same as the workload number X. The service monitor 40 of service 38 periodically and independently reads the size of the communication file 38 to obtain the workload number X.

Communication file 38 can also be used to indicate the availability status of service 36 if the operating system of the server machine (not shown) provides a utility to obtain the last modification date of a file. The last modification date of a file changes if the contents or the attributes of the file changes. In such a system, service 36 continuously updates the workload number, even if the workload number does not change, enabling its service monitor 40 to rely on the last modification date of the communication file 38 to infer the availability status of the service 36. If the last modification date does not change after a certain interval, the service monitor 40 can safely assume that the service 36 that it monitors is not available.

Figure 3:
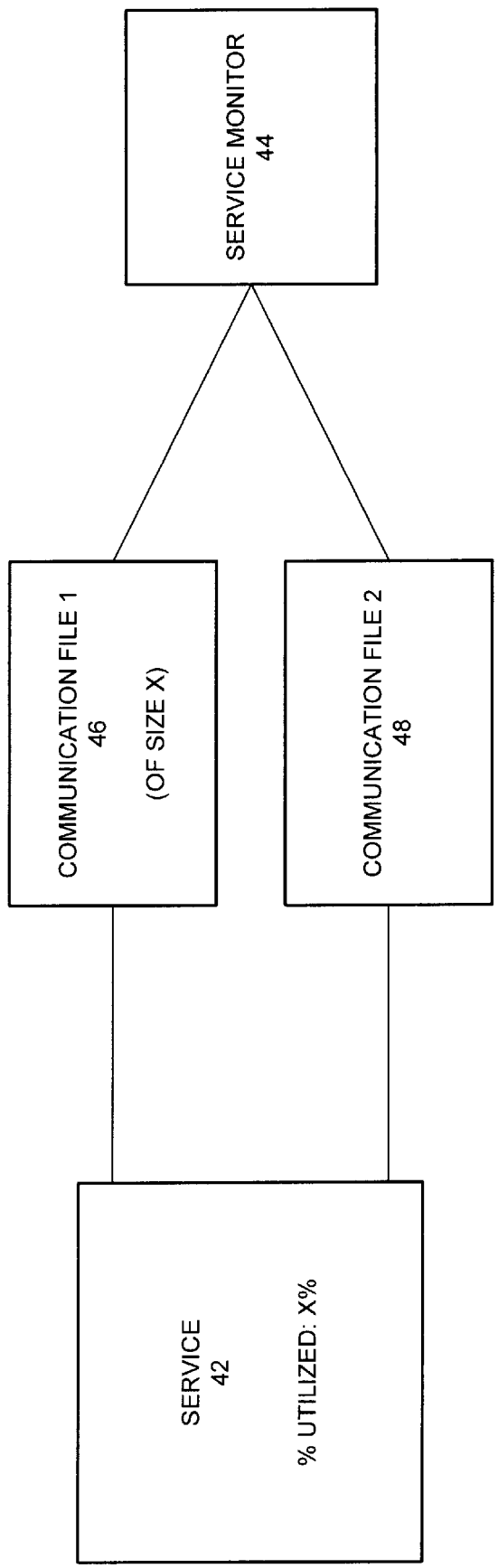
FIG. 3 is a schematic diagram showing a service monitoring system in accordance with a second embodiment of the invention.

Alternatively, a service and a service monitor can designate another, separate, communication file specifically for communicating service availability status. This embodiment of the invention is illustrated in FIG. 3, with service 42 being monitored by service monitor 44 via communication files 46 and 48. Communication file 46 operates as above, providing information about the percentage of utilization of the service 42. Communication file 48 is dedicated to providing information about the availability status of service 42. This is accomplished by selecting the size of the communication file 48 to be a monotonic increasing integer starting from 0. Service 42 periodically increments the size of the communication file 48 by one, thereby providing the equivalent of a "heartbeat" indicating that the service 42 is "alive," or available. If the size of the communication file 48 does not increase after a certain interval as sensed by service monitor 44, the service monitor may assume that the service 42 is not available.

In most operating system environments, updating the size of a communication file may require allocating disk storage for the file and may incur a disk I/O (input/output) operation each time the file size is updated. However, these costs can be eliminated for certain systems that support memory based file system and holey file. A hole is a region in a file that does not occupy storage space and is treated as if all the data stored in the region are bytes having a value of zero. A holey file is a file that contains at least one hole.

A memory based file system is a file system that uses computer random access memory (RAM) to store the contents of data files and the directory hierarchy of the file system. The advantage of a memory based file system is speed since accessing files in a memory based file system has the same speed as accessing RAM. The major drawback of a memory based file system is that the contents of a file of a memory based file system do not persist across system reboot. Solaris™ operating system of Sun Microsystems supports a memory based file system called tmpfs. The ufs file system in the Solaris™ operating system supports holey files.

If a holey file in a memory based file system is designated as the communication file 38 by service 36 and its service monitor 40, updating the size of the communication file 38 does not incur a costly disk I/O (input/output) operation. Furthermore, if the communication file 38 does not contain any data (that is, it is a holey file containing one big hole), then no RAM allocation is needed for the file 38. Thus, accessing the communication file 38 has the same speed as accessing RAM, and the cost of setting or retrieving the size of the holey communication file 38 in a memory based file system is about the same cost as a simple system call.

Utilization of file system services in the form of a covert channel in accordance with the invention is much simpler than writing RPC or networking programs. Furthermore, for systems such as Sun Microsystems' Solaris™ operating system that support memory based file systems and holey files, using a covert channel as described above to communicate workload information and service availability has very low communication overhead and is extremely efficient. It should be noted, however, that other file attributes may also be used as a covert channel for publishing workload and availability of a service such as service 36. However, among the available file attributes that can be used as a covert channel, file size is the simplest to use.

The above are exemplary modes of carrying out the invention and are not intended to be limiting. It will be apparent to those skilled in the art that modifications thereto can be made without departure from the spirit and scope of the invention as set forth in the following claims.

What is claimed is:

1. A method for publishing the status of a service having a variable workload and being performed in a computer system having one or more computers, the method comprising the steps of:

determining the workload of the service at a particular time;

establishing a first communication file of a size proportional to the determined workload; and periodically updating a timestamp associated with the first communication file to indicate that the service is active.

2. The method of claim 1, further comprising the step of periodically updating the size of the first communication file.

3. The method of claim 2, wherein the step of periodically updating comprises periodically redetermining the workload of the service and re-establishing the size of the first communication file in accordance with the redetermination.

4. The method of claim 1, further comprising the steps of:

establishing a second communication file; and periodically changing the size of the second communication file to thereby indicate that the service is active.

5. The method of claim 1, wherein the steps of determining and establishing are performed by the service.

6. A method for communicating service status information to one or more service monitors of a service group having one or more computers, the method comprising the steps of:

determining the workload of the service;

establishing a first communication file;

designating a size for the first communication file which is proportional to the workload of the service; and using the size of the first communication file to provide an indication of the status of the service.

7. The method of claim 6, further comprising the step of periodically updating the size of the first communication file.

8. The method of claim 7, wherein the step of periodically updating comprises periodically redetermining the workload of the service and re-establishing the size of the first communication file in accordance with the redetermination.

9. The method of claim 6, further comprising the steps of:

establishing a second communication file; and periodically changing an attribute of the second communication file.

10. The method of claim 9, wherein the attribute of the second communication file is the size of the second communication file.

11. The method of claim 6, wherein the steps of determining, establishing and controlling are performed by the service.

12. The method of claim 6, wherein the indication is acquired by a first service monitor, the first service monitor further performing the step of apprising at least a second service monitor of the status of the service.

13. A computer-readable medium containing a program which publishes the status of a service having a variable workload and being performed in a computer system having one or more computers, the program executing a procedure comprising the steps of:

determining the workload of the service at a particular time;

establishing a first communication file of a size proportional to the determined workload; and periodically updating a timestamp associated with the first communication file to indicate that the service is active.

14. The computer-readable medium of claim 13, wherein the procedure further comprises the step of periodically updating the size of the first communication file.

15. The computer-readable medium of claim 14, wherein the step of periodically updating comprises periodically redetermining the workload of the service and re-establishing the size of the first communication file in accordance with the redetermination.

16. The computer-readable medium of claim 13, wherein the procedure further comprises the steps of:

establishing a second communication file; and periodically changing the size of the second communication file to thereby indicate that the service is active.

17. The computer-readable medium of claim 13, wherein the steps of determining and establishing are performed by the service.

18. A computer-readable medium containing a program which communicates service status information to one or more service monitors of a service group having one or more computers, the program executing a procedure comprising the steps of:

determining the workload of the service;
  establishing a first communication file;
  designating a size for the first communication file which is proportional to the workload of the service; and
  using the size of the first communication file to provide an indication of the status of the service.

19. The computer-readable medium of claim 18, the procedure further comprising the step of periodically updating the size of the first communication file.

20. The computer-readable medium of claim 19, wherein the step of periodically updating comprises periodically redetermining the workload of the service and re-establishing the size of the first communication file in accordance with the redetermination.

21. The computer-readable medium of claim 18, the procedure further comprising the steps of:

establishing a second communication file; and
  periodically changing an attribute of the second communication file.

22. The computer-readable medium of claim 21, wherein the attribute of the second communication file is the size of the second communication file.

23. The computer-readable medium of claim 18, wherein the steps of determining, establishing and designating are performed by the service.

24. The computer-readable medium of claim 18, wherein the indication is acquired by a first service monitor, the first service monitor further performing the step of apprising at least a second service monitor of the status of the service.

25. A network service, comprising:

a first server configured to provide a service; and
  a first covert channel configured to indicate a status of the service, wherein said first covert channel comprises:
    a workload monitor configured to determine a workload of the service; and
    a file modifier configured to set the size of a first predetermined file in proportion to said determined workload.

26. The network service of claim 25, wherein said file modifier is further configured to dynamically maintain said size of said first predetermined file to be proportional to said workload of the service.

27. The network service of claim 25, wherein:

said first predetermined file has a timestamp maintained by said file modifier.

28. The network service of claim 27, wherein said file modifier is further configured to periodically update said timestamp to indicate whether the service is active on said first server.

29. The network service of claim 25, further comprising:

a second predetermined file having a size maintained by said file modifier;
  wherein said size of said second predetermined file is periodically modified to indicate that the service is active on said first server.

30. The network service of claim 25, further comprising:

a second server configured to provide the service; and
  a second predetermined file having a size maintained by a second file modifier;
  wherein said second file modifier is configured to periodically set said size of said second predetermined file to be proportional to a workload of the service on said second server.

* * * * *